US012239585B2

(12) United States Patent
Kline et al.

(10) Patent No.: US 12,239,585 B2
(45) Date of Patent: Mar. 4, 2025

(54) MOVABLE BASEPLATE COVER AND INBOARD BARRIER GATE OF A LIFT SYSTEM FOR A MOTORIZED VEHICLE

(71) Applicant: The Braun Corporation, Winamac, IN (US)

(72) Inventors: Justin M. Kline, Westfield, IN (US); Robert E. Bettcher, III, Winamac, IN (US); Alfred Lewis Budd, II, Winimac, IN (US); Jeff Ackerman, Arvada, CO (US); Chih-Wei Li, Seal Beach, CA (US); Sashank Allu, West Lafayette, IN (US)

(73) Assignee: The Braun Corporation, Winamac, IN (US)

( * ) Notice: Subject to any disclaimer, the term of this patent is extended or adjusted under 35 U.S.C. 154(b) by 0 days.

(21) Appl. No.: 18/668,324

(22) Filed: May 20, 2024

(65) Prior Publication Data

US 2024/0315894 A1 Sep. 26, 2024

Related U.S. Application Data

(63) Continuation of application No. 18/084,779, filed on Dec. 20, 2022, now Pat. No. 12,005,006, which is a (Continued)

(51) Int. Cl.
*A61G 3/06* (2006.01)

(52) U.S. Cl.
CPC .................................... *A61G 3/062* (2013.01)

(58) Field of Classification Search
CPC ...................................................... A61G 3/062
See application file for complete search history.

(56) References Cited

U.S. PATENT DOCUMENTS 4,664,584 A 5/1987 Braun et al.
4,804,308 A 2/1989 Hamblin et al.
(Continued)

FOREIGN PATENT DOCUMENTS

DE 20213310 U1 1/2004
EP 2353564 A2 8/2011
(Continued)

OTHER PUBLICATIONS

Combined Search and Examination Report for GB2209034.4, Jul. 5, 2022, 5 pages, For the Intellectual Property Office of the United Kingdom.

(Continued)

*Primary Examiner* — Saul Rodriguez
*Assistant Examiner* — Ashley K Romano
(74) *Attorney, Agent, or Firm* — Daniel Tallitsch; Tyler Schultz

(57) ABSTRACT

A barrier configured to be located at a door a vehicle having a lift platform to enable an individual using a mobility device to exit and to enter an interior of the vehicle. The barrier includes a support base configured to be fixedly coupled to the vehicle. A first side and a second side each extend from the support base are spaced apart to define an access location for the individual using the mobility device. A barrier gate or a barrier plate include an entry position and a blocking position wherein, in at least one embodiment, movement of the lift platform moves the barrier plate from the entry position to the blocking position.

20 Claims, 9 Drawing Sheets

Related U.S. Application Data continuation of application No. 17/154,556, filed on Jan. 21, 2021, now Pat. No. 11,559,444, which is a continuation of application No. 16/055,563, filed on Aug. 6, 2018, now Pat. No. 10,898,395.

(60) Provisional application No. 62/541,803, filed on Aug. 7, 2017.

(56) References Cited

U.S. PATENT DOCUMENTS

| | | | |
|---|---|---|---|
| 5,605,431 | A | 2/1997 | Saucier et al. |
| 6,077,025 | A | 6/2000 | Budd et al. |
| 6,585,474 | B1 | 7/2003 | Kameda |
| 7,207,765 | B1 | 4/2007 | Egan |
| 7,441,995 | B2 | 10/2008 | Sobota et al. |
| 7,445,416 | B2 | 11/2008 | O'Leary et al. |
| 7,816,878 | B2 | 10/2010 | Heigl et al. |
| 8,843,497 | B2 | 9/2014 | Stankiewicz et al. |
| 9,079,594 | B2 | 7/2015 | Storch |
| 9,469,325 | B2 | 10/2016 | Storch |
| 11,523,949 | B2 | 12/2022 | Anderson |
| 11,559,444 | B2 | 1/2023 | Kline et al. |
| 12,005,006 | B2 | 6/2024 | Kline et al. |
| 2001/0031195 | A1 | 10/2001 | Dupuy et al. |
| 2002/0076313 | A1 | 6/2002 | Vartanian et al. |
| 2002/0187032 | A1 | 12/2002 | Richard et al. |
| 2004/0184906 | A1 | 9/2004 | Dupuy et al. |
| 2006/0145651 | A1 | 7/2006 | Sullivan |
| 2012/0091772 | A1 | 4/2012 | Egan |
| 2014/0123379 | A1 | 5/2014 | Reid et al. |
| 2014/0377047 | A1 | 12/2014 | Gallingani et al. |
| 2015/0107911 | A1 | 4/2015 | Deleo et al. |
| 2017/0196741 | A1 | 7/2017 | De et al. |
| 2017/0252234 | A1 | 9/2017 | Budd et al. |
| 2017/0340493 | A1 | 11/2017 | Sidhu et al. |
| 2018/0126889 | A1 | 5/2018 | Bettcher, III et al. |
| 2023/0119483 | A1 | 4/2023 | Kline et al. |

FOREIGN PATENT DOCUMENTS

| | | | |
|---|---|---|---|
| WO | 0112120 | A1 | 2/2001 |
| WO | 2011144903 | A1 | 11/2011 |
| WO | 2015052515 | A1 | 4/2015 |

OTHER PUBLICATIONS

Examination Report for GB2003249.6, Dec. 6, 2021, 4 pages, For the Intellectual Property Office of the United Kingdom.

Examination Report for GB2003249.6, Mar. 2, 2022, 1 page, Intellectual Property Office of the United Kingdom.

Examination Report for GB2209034.4, Oct. 12, 2022, 3 pages, For the Intellectual Property Office of the United Kingdom.

International Search Report & Written Opinion for PCT/US2018/045496, Korean Intellectual Property Office; dated Nov. 27, 2018; 17 pages.

Swedish Search Report, Swedish Patent and Registration Office, Swedish Application No. 2050206-8, dated Sep. 2, 2020, 10 pages.

MOVABLE BASEPLATE COVER AND INBOARD BARRIER GATE OF A LIFT SYSTEM FOR A MOTORIZED VEHICLE

CROSS-REFERENCE TO RELATED APPLICATIONS

This application is a continuation of U.S. patent application Ser. No. 18/084,779, filed on Dec. 20, 2022, which is a continuation of U.S. patent application Ser. No. 17/154,556, filed Jan. 21, 2021, which is a continuation of U.S. patent application Ser. No. 16/055,563, filed Aug. 6, 2018, which claims priority to U.S. Provisional Patent Application Ser. No. 62/541,803, filed Aug. 7, 2017, having the title "Movable Baseplate Cover and Inboard Barrier Gate of a Ramp System for a Motorized Vehicle", the disclosures of which are incorporated herein by reference in their entirety.

FIELD OF THE DISCLOSURE

The present disclosure relates generally to a lift assembly for facilitating mobility-challenged individual's ascent to and descent from a structure, particularly, the present disclosure relates to retractable lifts used in motorized vehicles for efficient ingress and egress by wheelchair or scooter occupants.

BACKGROUND

Vehicles that provide transportation, such as taxis and the like, can be adapted for mobility-challenged individuals in order to provide such individuals the ability to travel in a manner similar to ambulatory passengers. Some of these vehicles have consisted of full-sized vans having an electrical or hydraulic powered wheelchair lift installed on the vehicle to assist wheelchair occupants into and out of the van. These lifts consisted of a horizontal platform that translates vertically to allow the wheelchair or scooter occupant easy access from ground level to the interior of the vehicle for transport. Other vehicles may have a ramp that can be electrically, hydraulically, or manually operated.

Some form of lift allows the wheelchair occupant to be transported from the ground external to the vehicle to the floor within the modified vehicle. The lift is typically stored in a vertical position in the rear or slide door entrance of the vehicle. To access the lift, the lift may be rotated outwardly about a pivot consisting of the lower end of the lift located approximately at the floor of the van, until the opposite end of the lift comes into contact with the ground.

BRIEF DESCRIPTION OF DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

DETAILED DESCRIPTION OF THE EMBODIMENTS

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure. Any alterations and further modifications in the described embodiments and any further applications of the principles of the inventions as described herein are contemplated as would normally occur to one skilled in the art. Although a limited number of embodiments are shown and described, it will be apparent to those skilled in the art that some features that are not relevant to the claimed inventions may not be shown for the sake of clarity.

Figure 1:
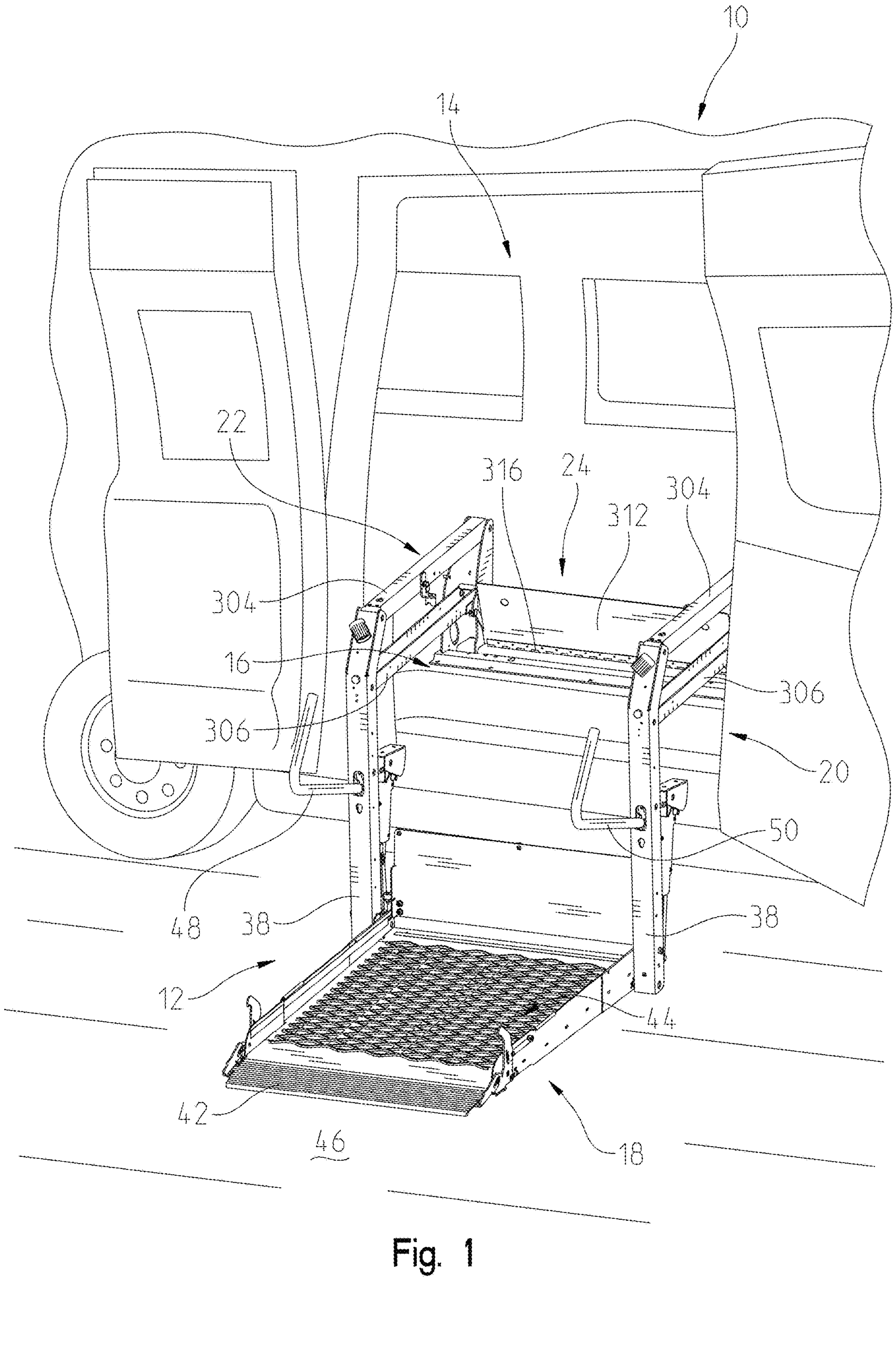
FIG. 1 is a side view of a vehicle capable of transporting a mobility-challenged individual including a deployed lift system.

Referring now to FIG. 1, a vehicle 10 adapted for transporting a mobility-challenged individual is shown. The vehicle 10 can be a van, taxi, bus, or any other type of vehicle capable of transporting a mobility-challenged individual. In FIG. 1, a side of the vehicle 10 is shown having a powered lift-gate 12 capable of being electrically, hydraulically, mechanically, or manually raised or lowered. The vehicle 10 includes an access opening 14 located on the side of the vehicle 10.

The lift 12 is mounted to a floor 16 of the vehicle 10. The parallelogram lift 12 comprises a platform assembly 18 (also referred to herein as the "lift platform"), coupled to a first parallelogram arm lifting assembly linkage 20 and a second parallelogram arm lifting assembly linkage 22. A vehicle mounting base assembly 24 includes a baseplate cover 312 and a support plate 316.

Each parallelogram arm lifting assembly 20 and 22 includes an upper arm 304, a lower arm 306, and an end link 38, which are coupled to the platform assembly 18. The platform assembly 18 is pivotally connected to the end links 38. In accordance with certain aspects herein, the vehicle lift 12 can employ a system or assembly of linkage members, such as arms, to move and synchronize extension and retraction of the platform assembly out of and into the vehicle 10. An end ramp 42 extending from an end of the platform 18 provides a transition from a ground plate 44 to the ground surface 46. A first arm rest 48 extends from one of the end links 38 and a second arm rest 50 extends from the other of the end link 38. While the lift 10 is at the ground level loading position of FIG. 1, the wheelchair user rolls onto the ground 46. Each end link 38 is provided with one of the arm rests 48 and 50 which are utilized by the wheelchair user as arm rests for auxiliary support during lifting. The arms 48 and 50 are pivotally connected to the end links 38 such that as the platform is caused to tilt upward during folding, the arms 48 and 50 pivot to a closed position as shown in FIG. 2.

Figure 2:
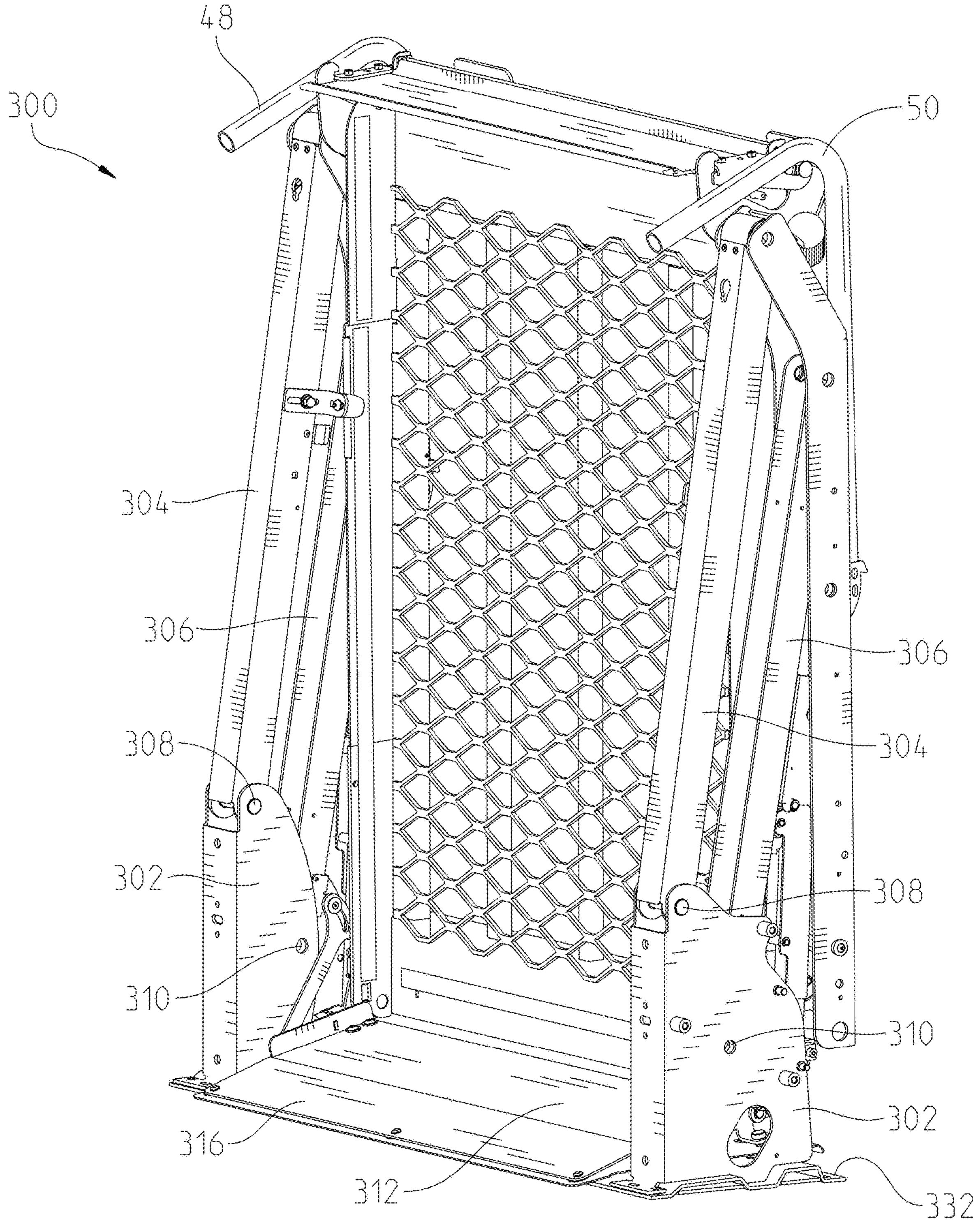
FIG. 2 is a rear perspective view of a lift system including a lift in a stowed vertical position before being be deployed for moving a mobility-challenged individual.

FIG. 2 illustrates a rear perspective view of one embodiment of a lift assembly 300 of the lift 12 from a vantage point of inside the vehicle looking toward the outside of the vehicle. In this embodiment, the lift assembly is in a collapsed vertical position. FIGS. 3, 4, 5, and 6 illustrate further details of the lift 300.

Figure 3:
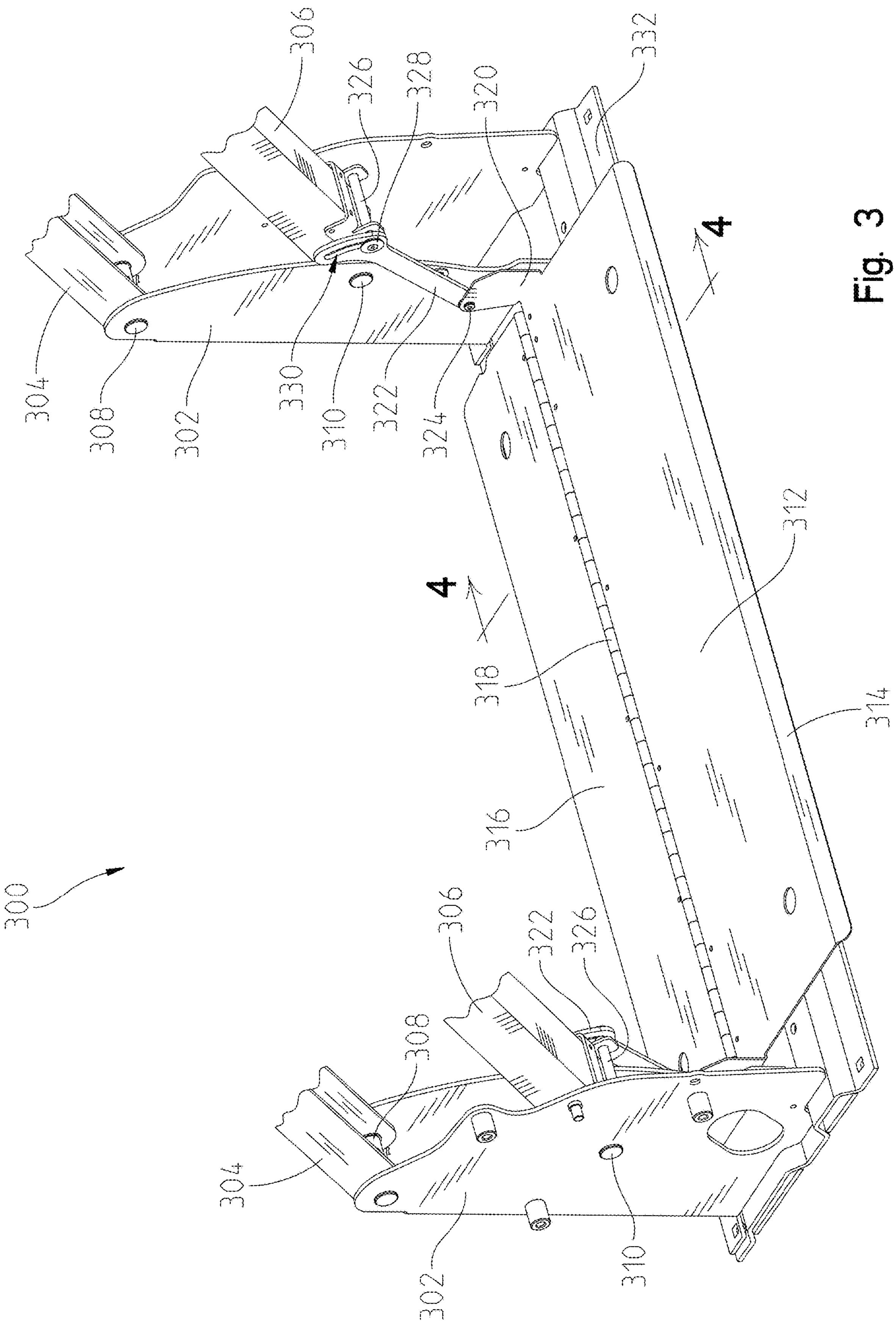
FIG. 3 is a perspective view of a baseplate cover assembly of a lift system.

Referring to the embodiment of FIGS. 2-6, the lift assembly 300 is disclosed. The lift assembly 300 includes a support base 332 that may be mounted to a floor of a vehicle via any conventional means. The lift assembly 300 also includes a base 302 formed on opposite sides of one another to define an access location. The base 302 may be formed integrally with the support base 332, or it may be coupled thereto. In any event, a pair of arms is pivotally coupled to the base 302 for raising and lowering a lift. In FIG. 3, the pair of arms includes the first or upper arm 304 and the second or lower arm 306. The arms 304, 306 may be configured to be substantially parallel to one another. Moreover, the upper arm 304 may be pivotally coupled to the base 302 via a pin at a first pivot location 308, and the lower arm 306 may be pivotally coupled to the base 302 via a pin at a second pivot location 310.

As there is a base 302 and pair of arms on one side of the lift, there is also a base and pair of arms on the opposite side thereof. The pair of arms may be pivotally moved between a plurality of positions in order to move the lift (not shown) between a stowed position and a fully extended position.

The lift assembly 300 further includes the baseplate cover 312 as shown in FIGS. 2-6. The baseplate cover 312 may be a substantially flat structure with an angled portion 314 formed at an end of the cover 312 furthest from the interior of the vehicle. The angled portion 314 facilitates movement of a wheelchair or scooter, generally known as mobility devices, onto and off of the lift. Other types of mobility devices are contemplated.

Figure 4:
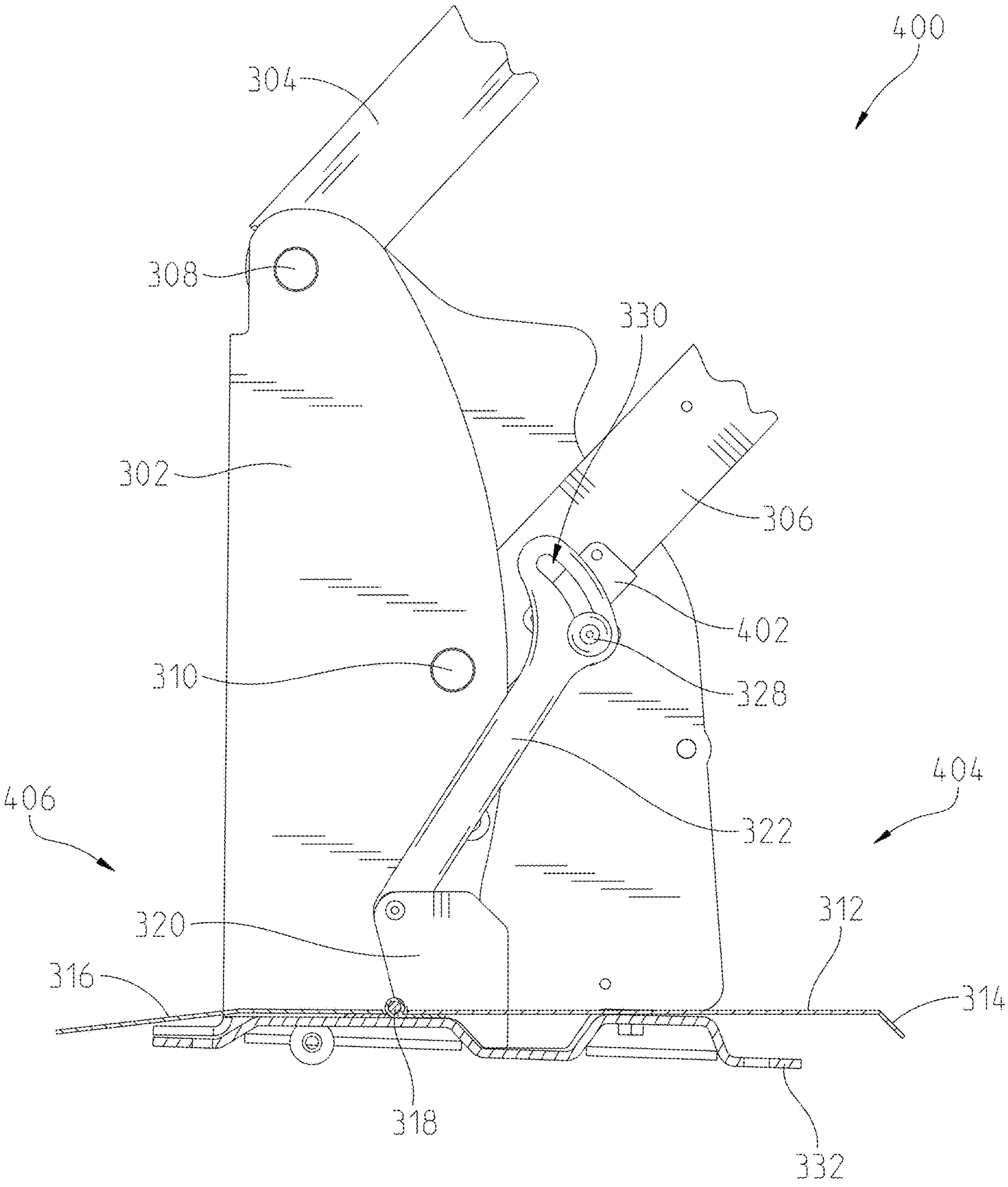
FIG. 4 is a side cross-sectional view of the lift system and baseplate cover assembly in a first position.

The baseplate cover 312 may be disposed in a substantially flat orientation as shown in FIGS. 3 and 4. At an opposite end of the angled portion 314, however, is a pivot linkage 318 which defines a pivot axis. The baseplate cover 312 may pivot about the pivot axis via the pivot linkage 318. This is described below.

In addition to the baseplate cover 312, the lift assembly 300 further includes a support plate 316 which may be fixedly mounted to the support base 332. The support plate 316 does not pivot and is not coupled to the pivot linkage 318. Rather, the support plate 316 provides a substantially flat surface upon which a wheelchair or scooter may traverse along before coming into contact with the baseplate cover 312 when moving to the lift.

The baseplate cover 312 is shown as being substantially flat, but it also may include a pair of ears 320 at opposite sides thereof. The pair of ears 320 protrude to be substantially perpendicular to the rest of the baseplate cover 312. Each ear 320 is pivotally coupled via a pivot 324 to a link arm 322. The link arm 322 is a substantially flat structure that has a first end pivotally coupled to the ear 320, and a second end that defines a slot 330 therein. Due to the size and length of the slot 330, the second end of the link arm 322 is wider than the first end.

The slot 330 may be partially arcuate. Alternatively, the slot 330 may be mostly straight. In any event, a pin 326 may be slidably disposed within the slot 330 as shown in FIGS. 3-6. The pin 326 may include a cap 328 or other structure for holding the pin 326 within the slot 330. In effect, the pin 326 may function as a pivot pin. The pin 326 may be coupled via a bracket 402 (FIG. 4) to the lower arm 306. Thus, as the lower arm 306 moves to raise and lower the lift, the pin 326 is free to slide within the slot 330.

As shown in FIGS. 3 and 4, the baseplate cover 312 is shown in its lowered position. As shown in FIG. 4, the baseplate cover 312 is disposed toward an exterior side 404 of the vehicle, whereas the support plate 316 is disposed toward an interior side 406 thereof. In addition, in this position, the lift may be in its stowed position or has not lowered to a position below the vehicle floor.

Figure 5:
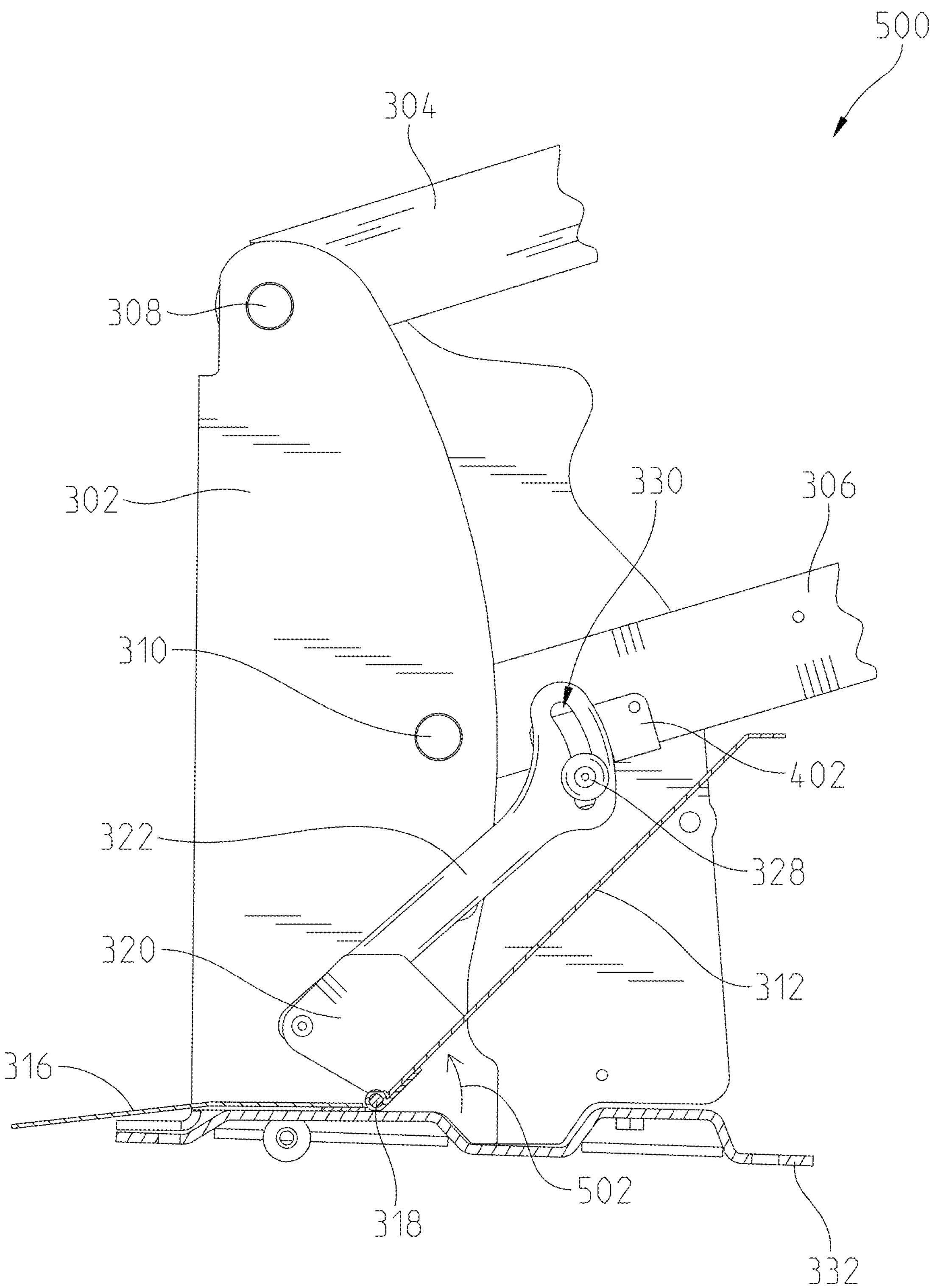
FIG. 5 is a side cross-sectional view of the lift system and baseplate cover assembly in a second position.

As the upper and lower arms 304, 306 are pivotally actuated by one or more actuators, the lift may be lowered to a ground or surface level that is below the entrance to the vehicle. Accordingly, as the lower arm 306 particularly pivots it induces movement of the link arm 322 which is again coupled thereto via the pin 326 and slot 330 arrangement. The pin 326 may begin to move within the slot 330 as the lower arm 306 pivots, an example of which is shown in FIG. 5. In FIG. 5, the pin 326 moves within the slot 330 and causes the link arm 322 to pivotally move the ear 320 of the baseplate cover 312 to rotate in a counterclockwise direction 502. As the ear 320 rotates in this direction, the baseplate cover 312 begins to pivot about the pivot linkage 318 in a counterclockwise direction 502 as well. In FIG. 5, the baseplate cover 312 is shown in an intermediate position 500 between its fully lowered position 400 and a fully raised position 600.

Figure 6:
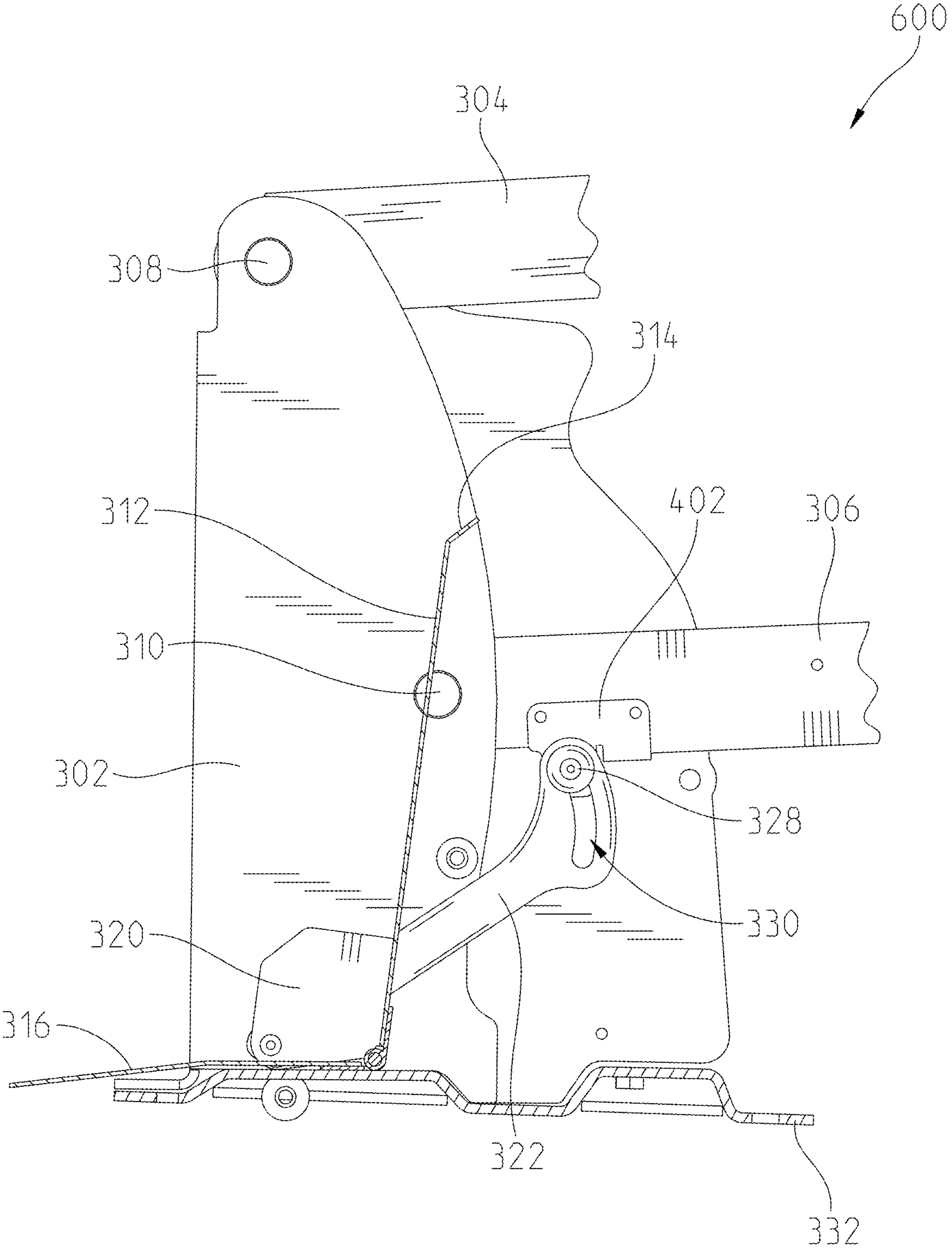
FIG. 6 is a side cross-sectional view of the lift system and baseplate cover assembly in a third position.

Once the lift is lowered to a ground or surface level, which in at least one instance, will be the furthest to which the lift may be lowered, the baseplate cover 312 is pivotally moved to its raised position 600 in FIG. 6. As shown, the baseplate cover 312 is disposed substantially vertically and at nearly a right angle to the support plate 316. See also FIG. 1. In other words, the baseplate cover 312 may be capable of being pivoted approximately 90° from its lowered position in FIG. 4 to its raised position in FIG. 6. Moreover, the baseplate cover 312 is capable of being moved to any position therebetween.

In the position of FIG. 6, the pin 326 may also reach an opposite end of the slot 330 defined in the link arm 322. In other words, the pin 326 may move the entire length of the slot between the lowered position 400 of FIG. 4 and the raised position 600 of FIG. 6. In another embodiment, however, it is possible the pin 326 does not traverse the entire slot 330 but may only travel along a portion thereof. In any event, as the lift is lowered and the pair of arms 304, 306 are pivotally actuated, the pin 326 may slide in the slot 330 defined in the link arm 322 thereby causing the link arm 322 to pivot the ear 320 and baseplate cover 312 about the pivot linkage 318 between a lowered position 400 and raised position 600.

As seen in FIG. 1 and FIG. 6, when the baseplate cover 312 is in the raised position, the baseplate cover 312 provides a barrier to prevent movement of an individual using a mobility device to move from the interior to the exterior of the vehicle 10. By moving the platform 42 to the ground position, the baseplate cover 312 is moved to the barrier position without further intervention by an individual and as such provides an additional degree of safety. As the platform 42 is moved from the ground position to a relatively horizontal position aligned with the floor 16 of the vehicle, the baseplate cover 312 returns to the planar position of FIG. 3 to enable the wheelchair to move from the platform 42 into the interior of the vehicle.

Figure 7:
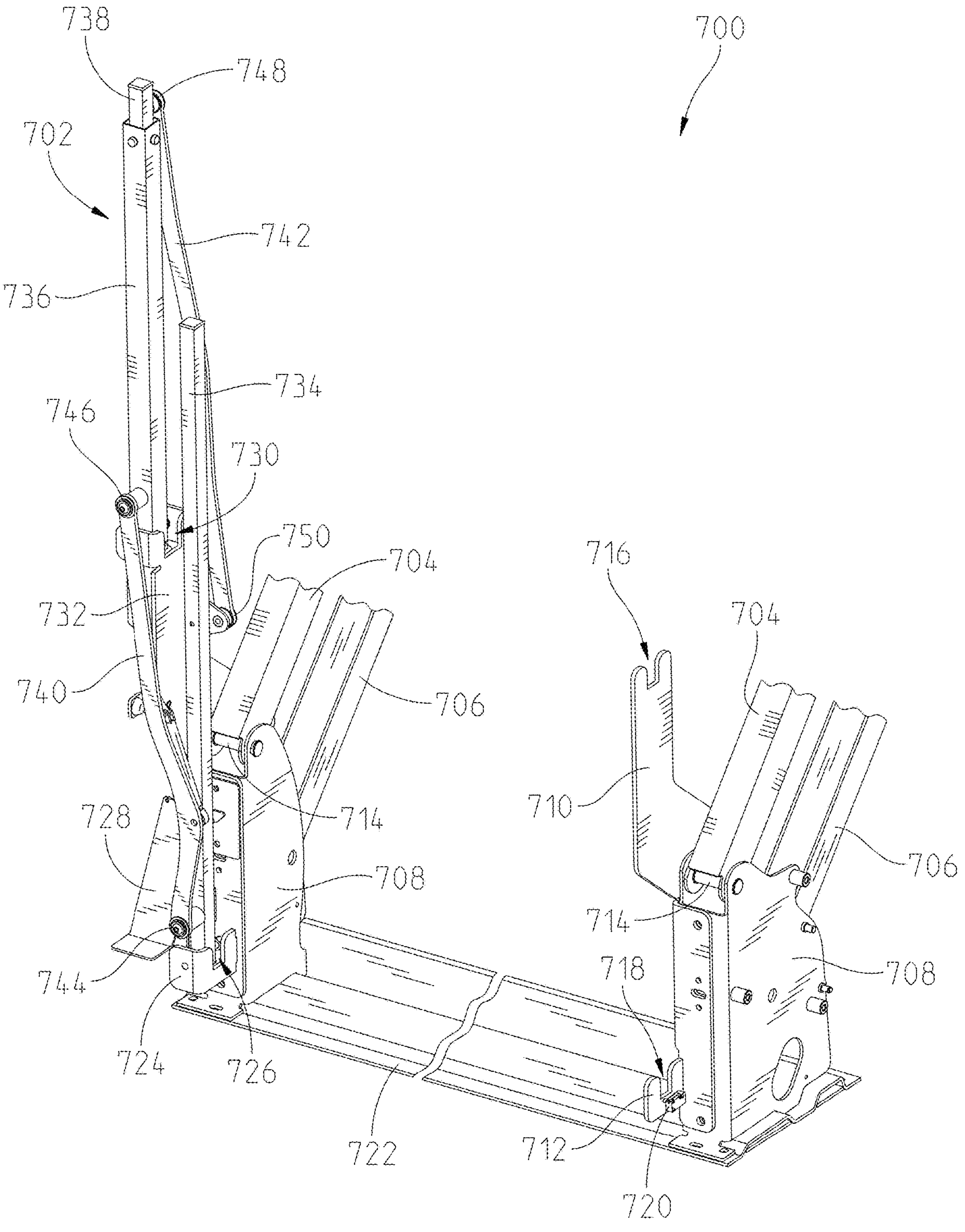
FIG. 7 is a side perspective view of a barrier gate in a stowed position of a lift system.
Figure 8:
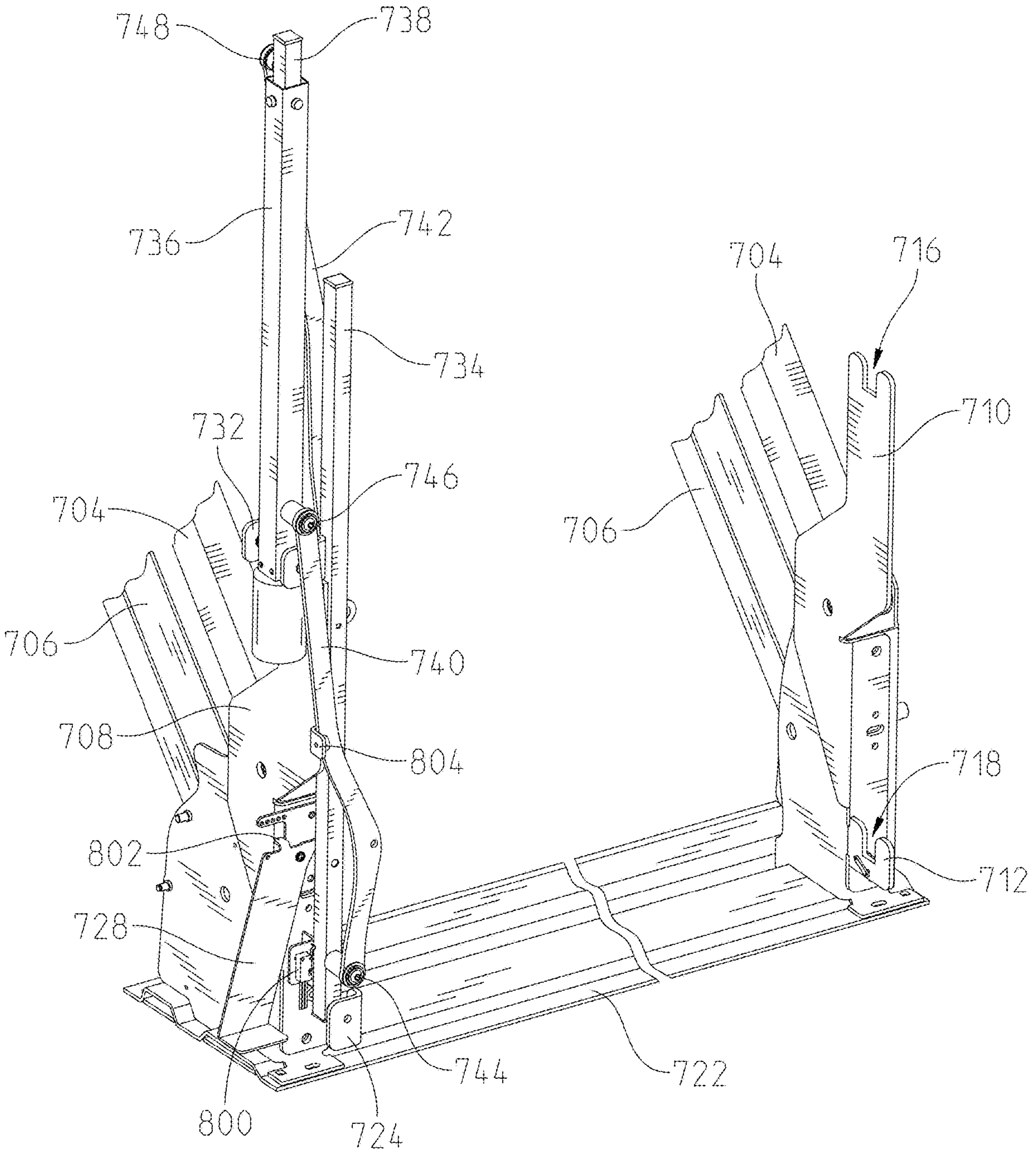
FIG. 8 is another side perspective view of the barrier gate of FIG. 7.
Figure 9:
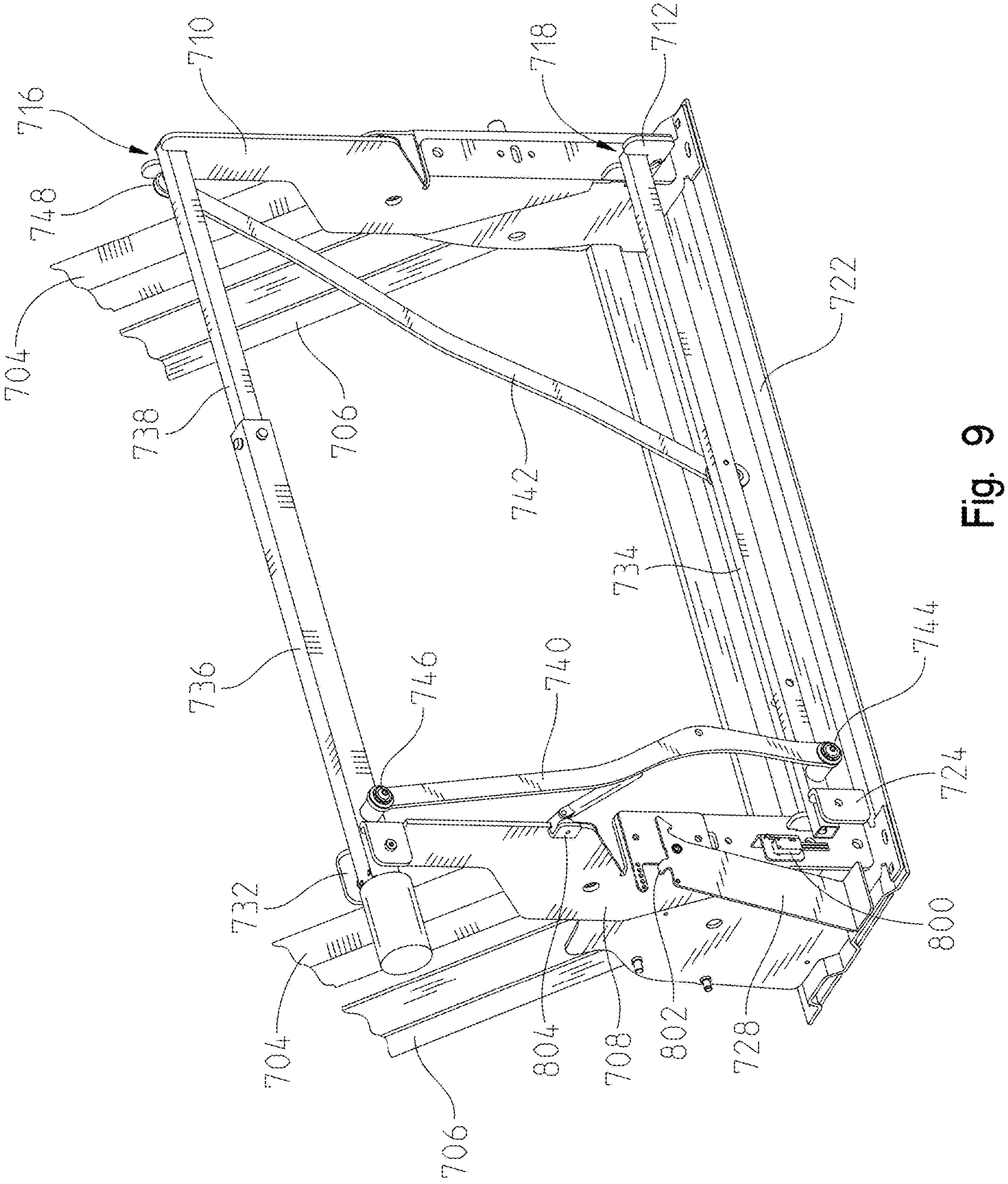
FIG. 9 is a perspective view of the barrier gate in the deployed position.

In another embodiment of the present disclosure, a lift assembly may be provided with another embodiment of a barrier gate assembly as described in FIGS. 7, 8, and 9. The barrier gate assembly may be provided for improved safety around a lift assembly that may be raised and lowered via the lift assembly. For example, the lift assembly may be accessed from a side or rear entry of a vehicle. The lift assembly may have a defined width to allow a wheelchair or scooter to enter or exit. Moreover, the lift assembly may be raised and lowered to allow a passenger of the wheelchair or scooter to be transported to or from the interior of the vehicle. With the lift assembly disposed in its lowered position such that the lift platform may be in contact with a ground surface, the barrier gate may be oriented to prevent another passenger inside the vehicle from being injured by slipping or falling out of the vehicle. The barrier gate assembly may provide additional advantages and benefits as described herein and known by one skilled in the art.

In FIG. 7, a portion of a lift assembly 700 is shown. It is worth noting that the lift platform assembly is not shown to allow for other features of the lift assembly 700 and a barrier gate assembly 702 to be more clearly illustrated. The lift assembly 700 may be any conventional lift assembly known to the skilled artisan. For instance, the lift assembly 700 may include a first upper arm 704 and a second lower arm 706, similar to the pair of arms 304, 306 described previously. The upper arm 704 and lower arm 706 may be substantially parallel to one another, although this is not required for all embodiments. More importantly, this disclosure is not limited to the arms being parallel to one another. The upper arm 704 and lower arm 706 may be pivotally coupled to a base 708 via one or more pivot pins 714 which is further coupled or mounted to a support base 722.

The upper arm 704 and lower arm 706 may be pivotally actuated by one or more actuators (not shown). The one or more actuators may include an electric actuator, a mechanical actuator, a hydraulic actuator, an electro-mechanical actuator, or any other type of actuator. A motor or other power-generating device (not shown) may power the one or more actuators. Other means may be used to pivotally actuate or move the upper and lower arms, and this disclosure is not limited to any particular means for doing so.

The upper arm 704 and lower arm 706 may be operably controlled to raise and lower the lift platform to allow a passenger of a wheelchair or scooter to enter or exit the interior of the vehicle. This is similar to the embodiments previously described herein.

The barrier gate assembly 702 may include a plurality of brackets. As shown in FIG. 7, an upper bracket 710 may be coupled to the base 708 and defines a first slot 716. A lower bracket 712 may be coupled to the base 708 as well at a location below the upper bracket 710. The lower bracket 712 may also include a slot 718 defined therein. Each slot may receive a portion of the barrier gate assembly 702 in the deployed position (see FIG. 9).

The barrier gate assembly 702 further includes a barrier gate formed by a plurality of members. For example, as shown in FIGS. 7 and 8, the barrier gate may include a bottom gate member 734, a top gate member 736, an extension member 738, a side member 740 and a cross member 742. The extension member 738 may be slidably disposed and coupled within the top gate member 736. In FIGS. 7 and 8, the extension member 738 is shown retracted in the top member 736. In this position, the entire barrier gate is disposed in its stowed or folded position. In FIG. 9, however, the barrier gate is in its deployed or unfolded position. Here, the extension member 738 may be received within the slot 716 of the upper bracket 710.

The cross member 742 may be pivotally coupled to the extension member 738 via a pivot coupling 748. Due to this pivot coupling 748, the cross member 742 may pivot with respect to the extension member 738 between the folded position and unfolded position. The cross member 742 is coupled to the pivot coupling 748 at one end, and it is further coupled to the bottom gate member 734 via a separate pivot coupling 750 at an opposite end thereof. Thus, the cross member 742 is capable of pivoting with respect to the bottom gate member 734 as well as the extension member 738.

As shown in FIG. 9, the bottom gate member 734 is pivotally coupled at one end to the base 708, and in the unfolded position the opposite end thereof is received within the slot 718 of the lower bracket 712. In the unfolded position, the extension member 738 and bottom gate member 734 are received with the slots of the respective upper and lower brackets. This coupling of the gate to the brackets provides a firm coupling to maintain the gate in the upright, unfolded position of FIG. 9.

In FIGS. 7 and 8, the side gate member 740 is shown being pivotally coupled to the top gate member 736 via an upper pivot coupling 746 and to the bottom gate member 734 via a lower pivot coupling 744. In the folded position of FIGS. 7 and 8, the side gate member 740 may come into contact with and rest against a stopper 804. The stopper 804 may be formed as part of the base 708 and a support arm 732.

The support arm 732 further includes an upper portion that defines an opening or slot 730. This opening or slot 730 permits the top gate member 736 to pivot between its folded and unfolded positions. As shown in FIGS. 7 and 8, the top gate member 736 is disposed substantially perpendicular to the opening 730, whereas in FIG. 9 the top gate member 736 is disposed within the opening 730.

A support bracket 724 is shown in FIGS. 7 and 8 as being coupled to the base 708. The support bracket 724 defines an opening 726 similar to the opening 730 defined in the support arm 732. The support bracket 724 allows the bottom gate member 734 to pivot between its folded and unfolded positions.

The barrier gate assembly 702 further includes a latch 728 for releasably coupling the barrier gate in its folded position. The latch 728 may include a finger or tab 802 (FIG. 8) that may be received within an opening defined in the base 708. Upon releasing the finger or tab 802 from the opening, the barrier gate may be unfolded from its folded position. Moreover, when returning the barrier gate to its folded position, the latch 728 may be further coupled via inserting the tab 802 into the opening of the base 708 to couple or fasten the gate in its folded or stowed position.

As shown in FIGS. 7 and 8, one or more limit switches may be used to detect when the barrier gate is in its folded (stowed) position and unfolded (deployed) position. For example, a first limit switch or sensor 720 may be coupled to the lower bracket 712. The limit switch or sensor 720 may detect when the bottom gate member 734 is disposed in the slot 718 of the lower bracket 712.

A second limit switch or sensor 800 may be coupled to the base 708 or support bracket 724 as shown in FIG. 8. Here, the switch or sensor 800 may detect when the bottom gate member 734 is disposed in its folded or stowed position. The limit switches or sensors may be in electrical communication with a controller and provide an alert or signal to an operator of the vehicle regarding the position of the barrier gate. This provides additional safety to the vehicle, its occupants, and any individual positioned in a wheelchair or scooter being moved via a lift assembly.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. For instance, in one embodiment, the barrier gate assembly 702 is incorporated into the lift assembly 300 and includes the baseplate cover 312 in combination with the barrier gate assembly. Further, this application is intended to cover such departures from the present disclosure as come within known or customary practice in the art to which this disclosure pertains and which fall within the limits of the appended claims.

The invention claimed is:

1. A barrier configured to block an access opening defined by a vehicle access device in a wheelchair accessible vehicle, the barrier comprising:

a support base configured to be fixedly coupled to the wheelchair accessible vehicle at the access opening; and a barrier plate moveably coupled to the support base;

wherein, in a blocking position, the barrier plate is disposed in a raised position to prevent an individual using a mobility device to move from an interior to an exterior of the wheelchair accessible vehicle through the access opening, and in the entry position, the barrier plate is disposed in a lowered position to permit an individual using a mobility device to move from the interior of the wheelchair accessible vehicle through the access opening and onto a platform of the vehicle access device disposed at the exterior of the wheelchair accessible vehicle adjacent the access opening.

2. The barrier of claim 1, wherein the barrier plate is configured to pivot about a pivot axis with respect to the support base between the entry position and the blocking position.

3. The barrier of claim 2, wherein the barrier plate is disposed substantially vertically in the blocking position.

4. The barrier of claim 3, wherein the barrier plate is configured to pivot about the pivot axis approximately 90° between the entry position and the blocking position.

5. The barrier of claim 2, wherein the barrier plate is a substantially flat structure with an angled portion, and wherein the angled portion facilitates movement of the mobility device onto and off of the platform.

6. The barrier of claim 1 further comprising at least one actuator, wherein the at least one actuator is operatively connected to the barrier plate to cause movement of the barrier plate between the entry position and the blocking position.

7. The barrier of claim 1, wherein the barrier plate comprises a generally flat, planar member and has at least one upturned flange at a longitudinal end of the barrier plate, and wherein at least one actuator is operatively coupled to the at least one upturned flange to cause movement of the barrier plate between the entry position and the blocking position.

8. A wheelchair accessible vehicle comprising:

a vehicle access device disposed at an access opening of the wheelchair accessible vehicle, wherein the vehicle access device is configured to provide an individual using a mobility device access to the wheelchair accessible vehicle; and a barrier having a support base fixedly coupled to the wheelchair accessible vehicle at the access opening and a barrier plate moveably coupled to the support base;

wherein, in a blocking position, the barrier plate is disposed in a raised position to prevent an individual using a mobility device to move from an interior to an exterior of the wheelchair accessible vehicle through the access opening, and in the entry position, the barrier plate is disposed in a lowered position to permit an individual using a mobility device to move from the interior of the wheelchair accessible vehicle through the access opening and onto a platform of the vehicle access device disposed at the exterior of the wheelchair accessible vehicle adjacent the access opening.

9. The wheelchair accessible vehicle of claim 8, wherein the barrier plate is a substantially flat structure with an angled portion formed at an end furthest from the interior of the wheelchair accessible vehicle, the angled portion facilitating movement of the mobility device onto and off of the platform.

10. The wheelchair accessible vehicle of claim 8, wherein the vehicle access device includes a first base disposed at an opposite side from a second base to define the access opening, and wherein the barrier is disposed between the first base and the second base.

11. The wheelchair accessible vehicle of claim 8, wherein the barrier plate comprises a substantially flat orientation in the entry position.

12. The wheelchair accessible vehicle of claim 8, wherein the barrier plate is configured to pivot about a pivot axis with respect to the support base between the entry position and the blocking position.

13. The wheelchair accessible vehicle of claim 12, wherein the barrier plate is a substantially flat structure with an angled portion, and wherein the angled portion facilitates movement of the mobility device onto and off of the platform.

14. The wheelchair accessible vehicle of claim 13, wherein the angled portion is formed at an end furthest from the interior of the wheelchair accessible vehicle and the pivot axis is disposed at an end nearest the interior of the wheelchair accessible vehicle.

15. The wheelchair accessible vehicle of claim 12, wherein the barrier plate is configured to pivot about the pivot axis approximately 90° between the entry position and the blocking position.

16. The wheelchair accessible vehicle of claim 12, wherein the barrier plate is disposed substantially vertically in the blocking position.

17. The wheelchair accessible vehicle of claim 8 further comprising at least one actuator, wherein the at least one actuator is operatively connected to the barrier plate to cause movement of the barrier plate between the entry position and the blocking position.

18. The wheelchair accessible vehicle of claim 17, wherein the actuator comprises a cylindrical member and a piston slidably received within the cylindrical member.

19. A method for operating the barrier in the wheelchair accessible vehicle of claim 8, the method comprising the steps of: deploying the barrier to the entry position when a platform of the vehicle access device is disposed at a vehicle floor level; and deploying the barrier to the blocking position when the platform of the vehicle access device is disposed below the vehicle floor level.

20. The method of claim 19, wherein: the barrier plate is configured to pivot about a pivot axis with respect to the support base, deploying the barrier to the entry position involves pivoting the barrier plate about the pivot axis in a first direction to a substantially flat position, deploying the barrier to the blocking position involves pivoting the barrier about the pivot axis in a second direction to a raised position, and the first direction is opposite the second direction.

* * * * *